No. 745,327. PATENTED DEC. 1, 1903.
A. CHURCHWARD.
ANTIHUNTING DEVICE.
APPLICATION FILED JUNE 19, 1902.
NO MODEL.
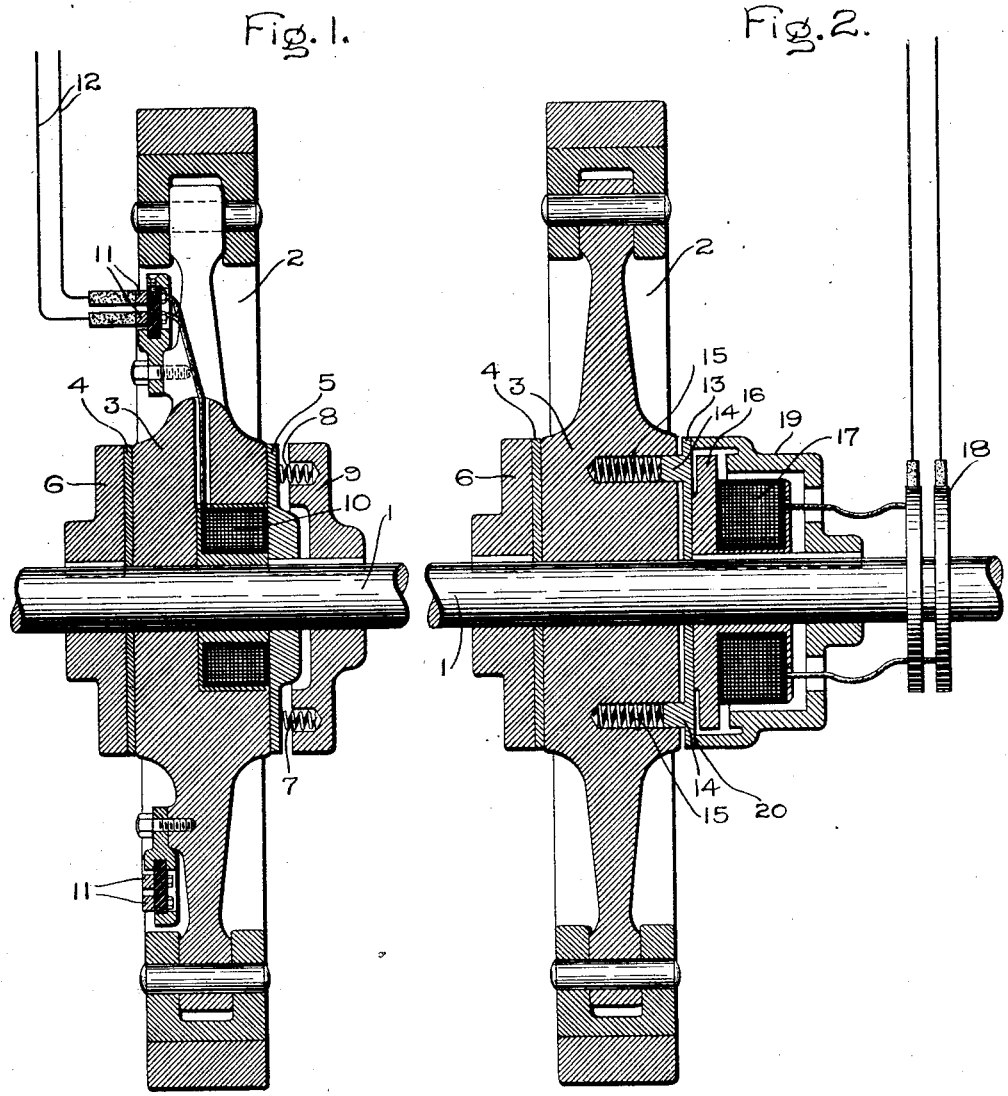
Witnesses:
G. A. Thornton.
Helen Alford
Inventor:
Alexander Churchward,
by Albert G. Davis
Att'y No. 745,327.                                                    Patented December 1, 1903.

UNITED STATES PATENT OFFICE.

ALEXANDER CHURCHWARD, OF NEW YORK, N. Y., ASSIGNOR TO GENERAL ELECTRIC COMPANY, A CORPORATION OF NEW YORK.

ANTIHUNTING DEVICE.

SPECIFICATION forming part of Letters Patent No. 745,327, dated December 1, 1903.

Application filed June 19, 1902. Serial No. 112,317. (No model.)

*To all whom it may concern:*

Be it known that I, ALEXANDER CHURCHWARD, a citizen of the United States, residing at New York, in the county of New York, State of New York, have invented certain new and useful Improvements in Antihunting Devices, of which the following is a specification.

My present invention relates to certain improvements in antihunting devices for use in connection with synchronous motors, rotary converters, or in any other relation where such a device is desirable, and comprises certain novel features, which I have pointed out with particularity in the appended claims.

For a detailed description of my invention reference is to be had to the following specification, taken in connection with the accompanying drawings, in which—

Figure 1 represents one embodiment of my invention, and Fig. 2 a modification.

In Fig. 1 the shaft 1 is either driven by or forms a continuation of the shaft of the machine with which the antihunting device is to be used. Mounted on this shaft is a fly-wheel 2, which against the opposition of a frictional resistance is permitted to move relatively to the shaft. This frictional resistance, attendant upon relative motion between the shaft and fly-wheel, is the factor which damps out the hunting tendency of the shaft 1. To secure this frictional resistance to motion of the fly-wheel relatively to the shaft, I mount the wheel so that its hub 3 is yieldingly pressed between friction-disks 4 and 5. The friction-disk 4, which may be of wood, fiber, or the like, is held between the hub 3 and a flange 6, keyed or otherwise fixed to the shaft 1. The disk 5 is pressed against the hub of the fly-wheel by springs 7 and 8, placed between the disk 5 and another flange 9, keyed or otherwise fixedly secured to the shaft 1. The disk 5 is splined upon the shaft 1, so as to be capable of a slight longitudinal motion thereon, but incapable of rotation about the shaft.

Located within a recess in the hub of the fly-wheel is a magnetizing-coil 10, which is supplied with current from collector-rings, (indicated at 11,) upon which bear brushes to which current is conveyed by means of leads 12.

The friction between the fly-wheel 2 and the parts between which it is yieldingly clamped is sufficient under ordinary conditions to prevent hunting of the machine to which the device is connected when the machine is running normally. When starting up the machine from a state of rest, however, this friction is insufficient to bring the fly-wheel up to speed as quickly as the driving-machine comes up to speed. Under ordinary circumstances the fly-wheel requires a considerable time before it reaches a speed of rotation synchronous with the driving-machine, during which interval the machine is apt to hunt or pump to a very inconvenient extent. By exciting the coil 10 with current the disk 5, which is of magnetic material, is urged strongly against the hub of the fly-wheel by magnetic attraction and constitutes a stiffly yielding, if not rigid, connection between the fly-wheel and the shaft upon which it is mounted. The fly-wheel is thus brought up to speed as quickly as the shaft which drives it, thereby preventing the initial pumping of the driving-machine. It will be evident that by adjusting the amount of current in the exciting-solenoid the friction between the fly-wheel and the shaft may be adjusted accordingly, and this may be readily performed while the device is in normal operation in case adjustment for any reason is then desirable.

In Fig. 2 a somewhat different arrangement is shown. As in Fig. 1, the fly-wheel 2 is mounted on a shaft 1 with one side of its hub 3 spring-pressed against a friction disk or plate 4 of suitable material, as wood or fiber, interposed between the hub and the flange 6. On the opposite side of the hub 3 is a disk 13, loosely mounted on the shaft 1 and provided with lugs 14, registering with openings in the hub, as indicated. In these openings are mounted springs 15, which bear against the plugs which close the openings. The disk or plate 13, carrying these lugs, is limited in its motion away from the hub of the fly-wheel by engagement with a disk or sleeve 16, keyed or otherwise fixedly secured upon the shaft 1. Surrounding the shaft and located adjacent to the disks 16 is a magnetizing-coil 17, to which current may be supplied from a suitable source by means of collector-rings and brushes, (indicated at 18.) A somewhat cup-shaped armature 19 is splined upon the shaft 1 and surrounds the magnetizing-coil, as indicated. Upon this coil being energized this armature is urged toward the flange 16. This operation causes the cylindrical edge 20 of a sleeve-like portion of the armature which projects over and surrounds the disk 16 to press against the movable spring-pressed disk 13. The degree of excitation of the magnetizing-coil 17 determines the degree of additional pressure thus exerted upon the hub of the fly-wheel. By sufficiently exciting the coil the fly-wheel may be practically locked with reference to the shaft by frictional pressure, thereby permitting it to be brought up to speed synchronously with the driving-shaft, after which by decreasing or entirely dispensing with the excitation of the exciting-coil the apparatus may be continued in normal operation.

What I claim as new, and desire to secure by Letters Patent of the United States, is—

1. An antihunting device for synchronous dynamo-electric machines, or the like, consisting of a device possessing inertia, an energy-consuming slipping connection between the dynamo-electric machine or the like and said inertia device, whereby the inertia device is normally driven, and means for substantially locking said connection during starting.

2. The combination of a shaft, a fly-wheel mounted on said shaft and relatively movable with respect thereto, a spring-controlled frictional connection between said shaft and said fly-wheel, and means adjustable while the shaft is in rotation for varying the frictional resistance between the shaft and the fly-wheel.

3. The combination of a shaft, a fly-wheel mounted thereon, means for producing a frictional resistance to rotation between said fly-wheel and said shaft, and magnetic means for adjusting the frictional resistance during rotation of the shaft.

4. The combination of a shaft, a fly-wheel mounted thereon, mechanical means for producing a frictional resistance to rotation between said fly-wheel and said shaft, and magnetic means for adjusting the frictional resistance during rotation of the shaft.

5. The combination of a shaft, a fly-wheel thereon, friction disks or plates arranged adjacent to the hub of said fly-wheel, springs for pressing the friction-plates against the hub of said fly-wheel, and means for locking the friction-plates against said hub or unlocking at will.

In witness whereof I have hereunto set my hand this 18th day of June, 1902.

ALEXANDER CHURCHWARD.

Witnesses:
BENJAMIN B. HULL,
HELEN ORFORD.